United States Patent [19]

Fogarty, Jr.

[11] 3,971,721

[45] July 27, 1976

[54] CONTINUOUS FILTER

[76] Inventor: John E. Fogarty, Jr., 12 Sherbourne, Westboro, Mass. 01581

[22] Filed: Dec. 31, 1974

[21] Appl. No.: 537,780

[52] U.S. Cl. .................................. 210/401; 210/77; 210/447; 425/197
[51] Int. Cl.² ......................................... B01D 33/00
[58] Field of Search ............. 210/77, 387, 400, 401, 210/447, 69; 425/197, 198, 199

[56] References Cited
UNITED STATES PATENTS

| | | | |
|---|---|---|---|
| 3,288,296 | 11/1966 | Hirs | 210/400 |
| 3,471,017 | 10/1969 | Kalman | 210/77 |
| 3,704,787 | 12/1972 | Norton | 210/387 |
| 3,855,126 | 12/1974 | Smith | 210/77 |

Primary Examiner—Charles N. Hart
Assistant Examiner—Ivars Cintins
Attorney, Agent, or Firm—Thompson, Birch, Gauthier & Samuels

[57] ABSTRACT

A filter system includes a path of flow for a flowable material to be filtered and a continuous filter element moveable transversely to such flow. The continuous filter element passes through a channel of predetermined and uniform cross section and carries a plurality of seal members at intervals along its length, each seal member being of the same cross sectional size and shape as the channel so as to form moving seals within the channel. The filter member is moved continuously or on demand through the channel, presenting a continuously renewed filter area to the flowable material. The new filter system is illustrated for filtering in the plastics industry.

18 Claims, 7 Drawing Figures

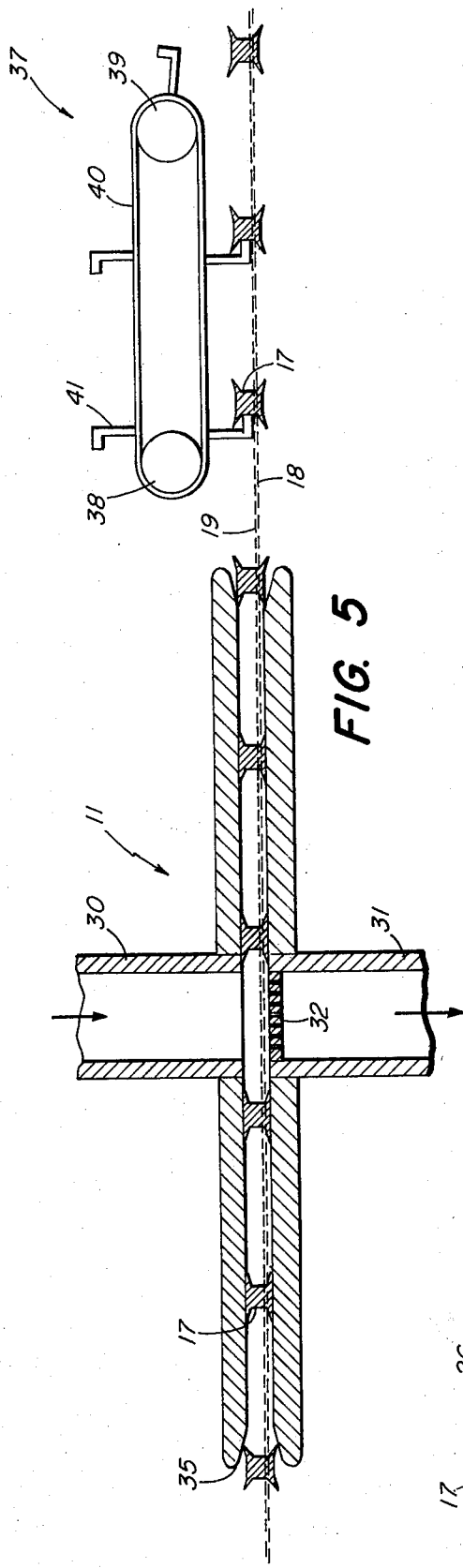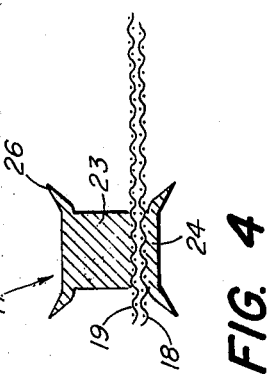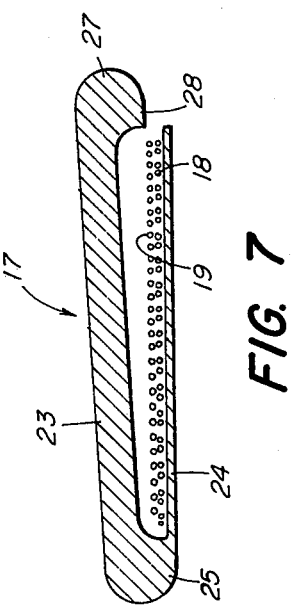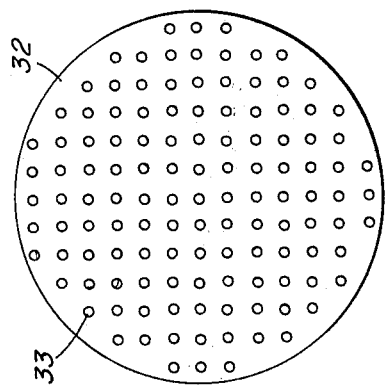

CONTINUOUS FILTER

BACKGROUND OF THE INVENTION

In numerous operations dealing with gases, liquids and other flowable materials it is necessary to remove contaminants and, of course, one way of removing them is by filtering. A problem in filtering is that filter screens get clogged and it is necessary to provide a fresh filter member in order to continue the operation. While there are many operations where it is entirely satisfactory to shut things down for a change of filter, there are many where it is impossible or at least unacceptably costly to do so. Many industrial and commercial operations require filtering under difficult conditions such that changing a filter element such as a filter screen is an awkward, time consuming and difficult task complicated by the fact that a filter element rapidly changed may leak or be torn and not fitted properly, or a seal at the filter may not be properly seated or tightly sealed. Perhaps even more to the point, in many situations variations in flow that may result from plugging or changing of filters can cause serious impairment of product quality or uniformity.

One of the most difficult examples of problems in filtering is in connection with extrusion of plastic. Ordinarily plastic material in flowable state is caused to flow to a location where uniformity of product is important. It is usually extruded hot and under pressure, and for purposes where continuity of flow is critical. This flow may, for example, be directed toward an extrusion die, to an injection mold to or from a melt pump, to a filament-forming die, or as may be required by a polymer producer, to a storage or shipping container. In this description of the invention, the plastics industry uses will generally be expressed in terms of extrusion and in terms of dies and molds, but it is to be realized that other flow usage of material in flowable form is included.

The present invention deals generally with filtering operations and, in a specific instance, with filtering of plastics which is one of the arts where filtering is beset with problems. Even new plastic material shipped directly from the manufacturer is likely to have some such contaminants, either in the plastic itself or picked up from the container in which the plastic is shipped. In particular, such plastic may have strings or "globs" or more highly polymerized material which will impair the final product. In any event, however, successful and economic operations of extrusion devices may require the reclaiming and recycling of scrap plastic. Such scrap inevitably comes contaminated, picking up solid particles which it carries with it into the mold. If these solid particles are allowed to get into a die or mold then, at best, they cause the formation of faulty products and at worst they will clog or damage the apparatus.

As with contaminants in many materials, this problem has been with the plastics industry for many, many years and is generally handled by filtering the molten plastic on as nearlyas possible a continuous basis. Such filtering when it operates well does an effective job of removing solid contaminants from the plastic. Filtering the molten plastic, however, has its problems, some of which are specifically related to the nature of plastic materials. Plastic is generally injected or pumped into a mold, die or other apparatus at a relatively high pressure such as for example, 1,000 to 5,000 pounds per square inch, and is necessarily injected at a sufficiently high temperature so that the plastic flows quite well. Depending on the specific plastic being employed the operating temperature is likely to be in the general order of 200°F or 300°F or higher. The filter medium, therefore, must be strong and resistant to elevated temperatures. This, however is only the start of the problem. In many filtering operations a relatively large quantity of solid contaminants may be filtered out of the plastic in a very short time so that the filter members can become completely or partially clogged in a very few minutes, stopping or reducing the rate of flow or changing the flow pressure, necessitating a change of the filter. It is entirely unsatisfactory to employ a filter which must be disassembled each time the filter medium is plugged, and accordingly it is important to find a suitable filter which can be changed and either replaced or cleaned without shutting down or slowing down the operation. The filtering systems and structures which have been employed in the plastics industry to solve this problem have been many different shapes, styles and kinds annd have had as their principal common characteristic the fact that they are not satisfactory.

It costs many dollars to shut down an operation for the time necessary to change a part such as a filter screen, so some way is needed to change such filter screens instantaneously or continuously. The most common system, and one which was developed many, many years ago and is still in use for filtering of plastic, employs a slidable filter element having two filter sections. The mold or die is operated with one of these filter sections in position to filter contaminants out of the flowing plastics. When it becomes sufficiently clogged so that cleaning is necessary, the other filter element is moved into position, leaving the first filter section extending outside the extrusion mold or pipe line so that it can be cleaned or replaced without stopping operation of the machine. One such system was described in Cowen U.S. Pat. No. 642,814 dated Feb. 6, 1900. As was said, this system is in one form or another still in use and does work to permit filtering of the plastic and to permit changing of filters. When such a filter becomes partially or completely clogged, the slide plate is forceably moved to its opposite position and the filter is replaced or cleaned. At best this system is not ideal because the filter generally becomes gradually more and more plugged with consequent reduction of flow, until finally the impaired flow can no longer be tolerated. The result is that the operation seldom runs at good efficiency. Other systems have since been proposed in which a succession of filter elements can be moved through a filter zone at such filter elements become clogged. More recent answers to the problems have been attempted and are illustrated in patents such as Bounin U.S. Pat. No. 3,084,987 and one or more patents to Kalman such as, for example, U.S. Pat. No. 3,471,017. With all of the proposed answers to the problems some degree of success has been achieved, but in every case the success is limited. In general, however, it appears to be desirable to employ a filter having a large number of filter sections so that filtering operation can be carried out for a long time without interruption. The experience with such filter systems in general is that in some of them there is a danger of tearing or distorting the filter when it is repeatedly moved step by step through the filter zone, in most of them there is an extremely serious danger that the filter seals will not be tight, and in many of them there is a gradual drop-off in filter flow so that process or product non-uniformity continues to be a serious problem. With all the improvement in the art through the years there has as yet been no solution to the problem of maintaining a uniformly clean, tight filter.

The filter system of the present invention has been specifically designed and engineered for the plastics industry, but it is of course useful in other industries and applications where similar requirements exist. For example, certain filtering operations in the rubber industry and in other industries can be handled by this filtering system.

GENERAL NATURE OF THE INVENTION

According to the present invention a filter zone is provided in a feed line for a flowable material such as a plastic, as for example, between a pump member and an extrusion mold, die or the like. At the filter position a permeable or porous support such as a grill is positioned as a backer plate for a filter member. An elongated multi-section filter is positioned to pass through the filter zone and is sealed and adapted to be moved lengthwise through the filter zone to provide a new and clean filter area either continuously or upon demand. The elongated filter member is continuous throughout its length and has secured thereto and carried thereon a plurality of seal members defining individual filter areas. Also secured to the filter member is a carrier or drive member having at least high longitudinal strength and being adapted to carry the filter stepwise or continuously through the filter zone under usual operating conditions such as conditions of high temperature and pressure without tearing or separating. In one embodiment of the invention the carrier member is a strong, high tensile strength metallic mesh which is secured to and carries the filter member itself. According to this same preferred embodiment of the invention seal members which may be metallic extend transversely across the filter member being permanently secured to both the filter member itself and to the carrier member or carrier strips, for example by brazing or the like. A suitable resin such as a polyimide may be used. Such individual seal members are positioned at intervals along the length of the filter member defining individual filter areas. These seal members may be regularly spaced or irregularly spaced, or may be spaced accordingly to a predetermined pattern. The seal members are adapted to engage and to form tight seals with flange members positioned beside the filter zone, and the flange member may be a single continuous member having a channel shaped to precise fit with the seal members. Similar flange members are positioned one at the entry position and another at the exit position of of the filter so that each seal member in turn is adapted to form a seal first at the entry position and then, after being advanced across the filter zone, subsequently at the exit position.

In a presently preferred embodiment of the invention a block member has a passage or flow path through the block to receive an input and output connection for the flowing plastic. A channel or seal passage extends through the block transverse to the plastic flow. The continuous filter member passes through this transverse channel with the seals fitting tightly to the walls of the channel to provide protection against leaks at the filter zone. The filter member is pushed or drawn through the channel, either continuously or on demand, to provide continuously clean filter area, and at least one seal element is always within the channel to provide a constant tight seal of the filter zone.

The filter according to the present invention is adapted to operate satisfactorily under temperatures and pressures in excess of those ordinarily encountered in plastics operations. Specifically the seals between flanges and seal members or between channel and seals satisfactorily withstand pressures in excess of 5,000 pounds per square inch at temperatures in excess of about 200° or 300°F. The carrier members operate to carry the filter element through the filter zone under the same operating temperatures and pressures and to convey the filter element through the zone both when such element is fresh and free from collected contaminants and when such filter element has been used and is clogged with solid contaminants.

The general nature of the invention is illustrated in further detail in the accompanying drawings in which:

FIG. 4 is a side view partially in section of the filter member of FIG. 2;

FIG. 5 is a side view, partially schematic, of a filter system, partially in section;

FIG. 6 is a front view of a backer plate according to the filter system of FIG. 5;

FIG. 7 is an end view of a seal member for the filter member of FIGS. 2 or 3.

SPECIFIC DESCRIPTION OF THE INVENTION

Figure 1:
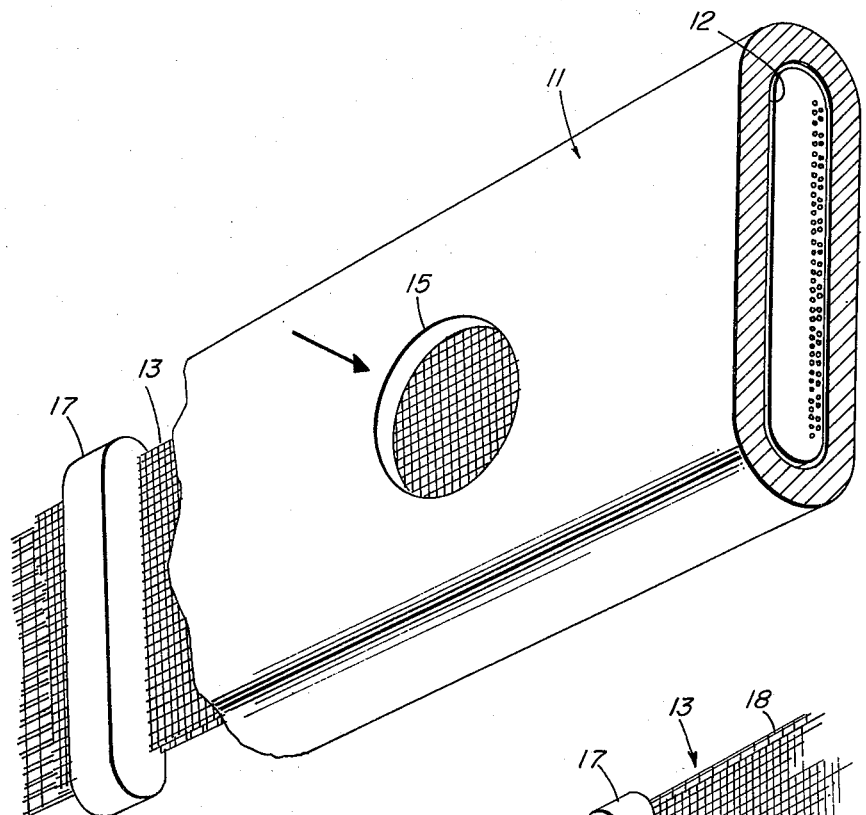
FIG. 1 is a perspective view of a filter assembly according to one embodiment of the invention.

In FIG. 1 is illustrated a filter assembly including an assembly block 11 having a channel 12 extending therethrough and a filter element 13 passing through channel 12. Extending transversely through the filter assembly 11 is a passage or opening 15 adapted for the passage of a fluid to be filtered through the assembly, the direction of flow being from front to back in the view illustrated. In FIG. 5 is shown the entry passage 15 and the opposite mating exit passage 16 not visible in FIG. 1. The assembly 11 is adapted to be connected into a flowing system, as shown in FIG. 5, by means of suitable pipes of the like to cause a flowing fluid to pass through the assembly, entering through opening 15 and exiting through opening 16 and being filtered within the assembly as will be described hereinafter.

The filter element 13 has a support member 18 desirably in the form of a wire mesh on which may be secured a filter screen or web 19. Permanently affixed to and carried by the carrier 18 and filter web 19 are a plurality of spaced seal elements 17. In the embodiment of the invention as illustrated, carrier 18 and web 19 are held together by seal elements 17 as shown in further detail in connection with FIG. 7.

The carrier member 18 is characterized by having at least high longitudinal strength to provide permanent mounting means for the seal member 17 and to permit filter element, including seal member 17 to be drawn through the filter assembly 11. Because seal elements 17 fit tightly within channel 12, a high tensile strength carrier 18 is employed. According to one form of the invention, carrier member 18 comprises a plurality of longitudinal strands 21 of a high strength material. A suitable high strength material may for example be a metallic wire such as, for example, a stainless steel wire or the like. Brass coated steel wire is satisfactory. Joining together the longitudinal strands 21 of carrier 18 are a plurality of transverse strands 22 which may but need not be high strength strands. In one embodiment of the invention the transverse strands are also brass coated steel. According to one form of the invention a plurality of high strength steel (brass coated) strands 21 are secured together and held in their proper spacing by means of a multiplicity of steel wires or other fibers 22 extending across the width of the carrier member 18 and secured to each of the longitudinal strands. The presently preferred mesh for all-around use has brass coated steel transverse fibers, but for low temperature uses polyester transverse fibers can be employed, as can other materials. Such a wire mesh is commercially available. The longitudinal strands 21 provide strong longitudinal strength while the transverse strands 22 provide permanent, controlled spacing between the longitudinal strands throughout the entire length.

Secured to one side of the carrier 18 is a filter member or screen 19. This filter screen preferably extends the full length of the carrier 18 and is secured to the carrier along its entire length. According to a presently preferred embodiment of the invention the carrier 18 is overlaid with a filter screen of desired mesh size and the two are secured together by means of the seals 17, as shown further in FIG. 7. For certain filtering operations the filter screen 19 is not necessary and the necessary filtering can be obtained by means of the carrier member 18 alone. In general, however, the filter screen 19 is employed and consists of a suitable filter material of the desired screen size for proper filtering. In the plastics industry it is usual to employ a filter member having a screen size corresponding to about a 40 mesh screen or finer and a screen of 100 mesh or 200 mesh is quite usual, but one of the advantages of the invention is the wide freedom of choice to use virtually any desired filter porosity merely by choosing an appropriate filter 19.

Figure 2:
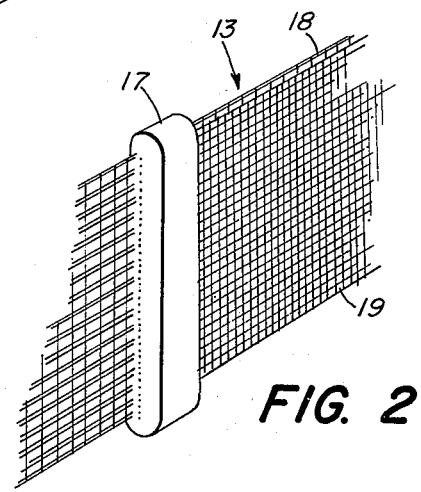
FIG. 2 is a perspective view of a filter member according to the same embodiment of the invention.
Figure 3:
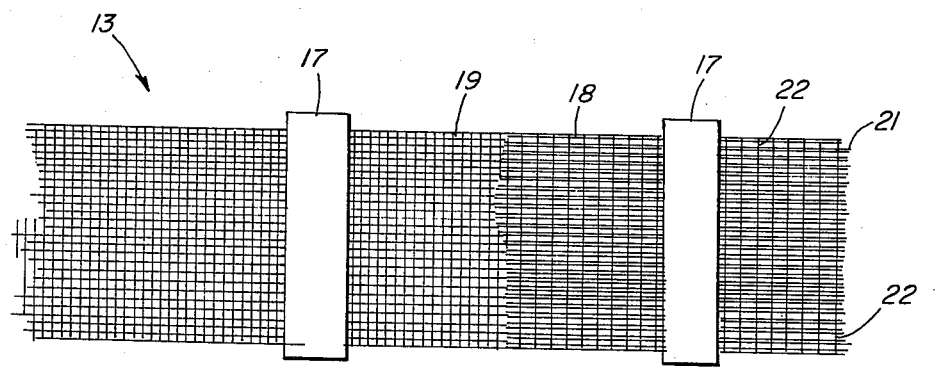
FIG. 3 is a front view of the filter member according to FIG. 2.

The nature of the seal member 17 is more clearly illustrated in FIGS. 2, 4 and 7. Referring to FIG. 2 and FIG. 4 it is observed that filter member 13 includes a carrier mesh 18 having a filter screen 19 overlaid across the upstream surface thereof. The carrier 18 and filter screen 19 are held together along their full length by means of a plurality of seal members 17. Ordinarily the seal members are spaced approximately regularly, but if desired the several seal members 17 may be irregularly spaced at programmed intervals. Between seal members are a succession of filter areas where the fluid being filtered presses the filter screen 19 against the carrier 18. The carrier 18 and screen 19 are offset very close to the carrier or downstream side of the filter member.

Referring to FIG. 7, it is observed that the seal member 17 is a generally U shaped member having a body or upper jaw 23 and a base 24 extending from the foot or closed end 25 of the body 23. At the opposite or open end 27 of body 23 is a downwardly extending tooth 28 defining a recess between tooth 28 and the foot 25. The carrier 18 and filter screen 19 are placed within this recess, resting on base 24. The recess is then filled with a brazing compound, base 24 is pressed firmly toward body 23 and the seal assembly is then furnace brazed. For less rigorous conditions other binding means may be used; an epozy glue is fine for low pressure, low temperature uses. The seal 17 (see, for example, FIG. 2) firmly and permanently holds the carrier 18 and screen 19 together. Base 24, as shown, is relatively thin with the result that the wire members ride through channel 12 position close to the downstream side of channel 12.

The volume between successive seal elements 17 on the upstream side of filter screen 19 serves as a trap or storage volume to hold and remove from the system the solids or other matter removed from the flowing stream.

At the top or upstream side of seal 17 a pair of pressure lips 26 extend from body 23 of the seal. These lips 26 normally extend parallel with carrier 18 or aimed slightly upward or away from the carrier. When the seals ride in channel 12, fluid pressure urges these lipe 26 firmly against the upper or upstream wall of channel 12, thereby helping to tighten the sealing effect. Another pair of lipe 26, may, if desired, extend from base 24 of seal 17, similarly sealing against the downstream wall of channel 12.

In FIG. 5 is shown a filter assembly generally designated 11 connected into a conduit or pipe for the flow of a fluid. For example, an intake pipe 30 leads from a source of fluid such as flowable plastic to the assembly 11 and a discharge pipe leads to further apparatus such as an extrusion die, an injection mold, a storage container, a filament former or the like. Filter element 13 extends through channel 12 transversely to the direction of flow. Seals 17 fit tightly against the walls of channel 12, substantially sealing the assembly against fluid leakage. A backer plate 32 is positioned essentially flush with the downstream wall of channel 12, and has a multiplicity of holes 33 therethrough to permit essentially unimpeded flow. Such a backer plate is conventional in the plastics industry.

Carrier wire 18 is positioned almost against the downstream wall of channel 12, and when a fluid is being filtered, carrier 18 is pressed against backer plate 32, largely preventing the fluid from by-passing the filter screen 19. At the ends of channel 12, lips 35 of the assembly block 11 spread slightly to receive pressure lips 26 of seal elements 17 on the entry end of block 11, and at the exit end to release seals 17 gradually. Drive means 37 of suitable design pulls filter element through channel 12. One suitable drive means has drive rolls 38 and 39 with belt 40 passing therearound. A plurality of drive hooks 41 on belt 40 are shaped to seize seal elements 17 and move them along either continuously or on demand. Either drive roll 38 or drive roll 39 may be powered, and since the driving force is relatively high both rolls may be powered.

As can be seen from the drawing a fluid to be filtered is introduced into the filter assembly through pipe 30 usually under several thousand pounds pressure where it fills the cavity defined by the walls of the assembly 11 and a pair of seals 17 one on either side of the filter zone. The fluid accordingly is forced through the filter element and emerges in filtered condition into pipe 31. A plurality of seals 17 is at all times positioned with channel 12 of the filter assembly 11 with the result that the seal assembly which seals the filter against leakage includes always at least two seal elements 17 and generally att least two such elements on each side of the filter zone. As the filter element is moved through the channel 12 a new seal element 17 enters the operating or filtering area and is backed up by a second seal element 17 further removed from the filter zone. On the exit side of the assembly 11, as successive filter elements 17 pass out of the assembly, a successive element is already in channel 12 to restrict the pressure acting against the emerging element 17. Accordingly, there is no surge or spurt of filter fluid upon the emergence into the open air of one of the seal elements 17.

Generally lubrication of the surfaces between the seal elements 17 and the walls of channel 12 is not required, particularly if the fluid being filtered itself acts as a lubricating agent. In the case of filtering of plastic material if the entire filter element 11 is maintained at a sufficiently high temperature to keep the plastic in a flowable condition until after it has emerged from the filter assembly 11, the plastic will serve as a lubricant. In most cases a separate lubricant is avoided in order to avoid contamination of the fluid being filtered.

The present invention has been described in terms of continuous filtering apparatus designed for the specific and particular needs of the plastics industry. It is usual to filter plastic in a flowable condition at pressures between about 1,000 and about 5,000 pounds per square inch and at temperatures at which the plastic is flowable with moderately low viscosity. With many plastics this means temperatures in the general range of approximately 300° and may include plastics which melt or soften substantially below the boiling point of water as well as plastics which are relatively high temperature thermoplastic materials. In addition monomers or partially polymerized polymers may be filtered. For plastic filter operations it is of great importance that the filtering operation proceed substantially continuously and that it should be possible to continue the filtering operating essentially without shutting down or stopping the operation for causes related to equipment. It is time consuming and often very expensive to interrupt the operation of plastic extrusion equipment or plastic molding equipment. In the case of thermo-set resins it is obvious that such interruption runs the danger of the entire plastic body setting prematurely. For example, if a filter assembly is operated with a thermoset e.g. phenolic resin and must be stopped there is always the danger that the plastic will set firmly within the filter assembly or at a point upstream or downstream from the filter thus requiring an extremely expensive operation of removing such set plastic.

In many cases similar difficulties exist in the rubber industry where, once again, a rubber monomer or polymer may be filtered prior to a forming operation. In connection with the plastics industry and the rubber industry, and other industries using polymers and polymerizable materials, such materials known herein as polymer materials have many common characteristics including filtering problems that can be solved by the present invention. In addition to the plastics industry and the rubber industry the filter of the present invention can be employed in essentially any situation where it is desired to filter a fluid including gases and/or liquids. As far as is now known the filter system of the present invention is not limited in such a way as to make it unsatisfactory for any broad and general filtering operation although its particular advantages are best realized where a difficult filtering operation is required and where continuity of flow at uniform pressures and flow rates is important.

It is conventional in the art to employ various heating and/or cooling means to maintain a desired flowable condition of the plastic or other flowable material in the filter zone and into the subsequent apparatus as well as in or along the sealing channel 12.

I claim:

1. A filter apparatus for pressurized material in flowable form comprising:
   a. means for forming a filter zone;
   b. pressurized inlet and outlet conduit means for directing a flow of said material through said filter zone;
   c. elongated channel means extending transversely in relation to the flow axis of said conduit means, said channel means having first and second aligned channel sections in communication at opposite sides with said filter zone, said channel sections being formed or imperforate walls;
   d. an elongated perforate filter web for filtering said material, said filter web being adapted to extend longitudinally through said first channel section, across said filter zone, and through said second channel section, said filter web having a thickness less than the corresponding internal dimension of said channel sections;
   e. means for moving said filter web longitudinally; and
   f. a plurality of seal members fixed to and extending across said filter web transversely to the longitudinal axis thereof and spaced at intervals along the length thereof, said seal members having a thickness greater than the thickness of said filter web, said seal members being adapted to cooperate in internal sealing engagement with the imperforate walls of said channel sections, the lengths of said channel sections being greater than the spacing between successsive seal members on said filter web.

2. The apparatus as claimed in claim 1 wherein the imperforate walls defining said first and second channel sections have substantially identical internal cross-sectional dimensions.

3. The apparatus as claimed in claim 1 wherein said filter web is comprised of a plurality of perforate strips held together at spaced intervals by said seal members.

4. The apparatus as claimed in claim 1 further characterized by a stationary perforate backet plate in said filter zone, said backer plate being aligned substantially with the downstream sides of said channel sections to thereby provide a support for the section of said filter web extending across said filter zone.

5. The apparatus as claimed in claim 4 wherein said seal members are arranged to locate said filter web in close proximity to said backer plate in a plane downstream from the longitudinal axis of said channel sections.

6. The apparatus as claimed in claim 1 wherein said seal members include lips adapted to be urged by said material against the imperforate walls of said channel sections.

7. The apparatus as claimed in claim 1 wherein the lengths of said channel sections are greater than twice the spacing between successive seal members on said filter web.

8. Apparatus for removing contaminants from pressurized material in flowable form such as molten synthetic resin comprising:
   a. means for forming a filter zone;
   b. pressurized inlet and outlet conduit means for directing a flow of said material through said filter zone;

c. elongated channel means extending transversely in relation to the flow axis of said conduit means, said channel means having first and second aligned channel sections in communication at opposite sides of said filter zone;

d. an elongated filter screen for filtering said material, said filter screen being adapted to extend longitudinally through the first of said channel sections, across said filter zone, and through the second of said channel sections, said filter screen having a thickness less than the corresponding dimension of said channel sections;

e. means for moving said filter screen longitudinally; and f. a plurality of seal members fixed to and extending across said filter screen transversely to the longitudinal axis thereof, and spaced at intervals along the length thereof, each of said seal members having its dimension in the direction of the thickness of said filter screen greater than the thickness of said filter screen, said seal members being adapted to cooperate in internal sealing engagement with said channel sections, each of said channel sections being formed of fluid tight walls for a length greater than the interval between adjacent seal members, ensuring throughout operation that at least one seal member is located in each channel section and that a seal is provided thereby between said filter zone and external space.

9. The apparatus of claim 8 including a stationary perforate screen support member in said filter zone substantially aligned with the downstream sides of said channel sections, said seal members being constructed to enable the portion of said screen in said filter zone to engage said screen support member.

10. The apparatus of claim 9 wherein at least the predominate portion of each seal member in the direction of thickness of said screen lies on the upstream side of said screen.

11. The apparatus of claim 8 for use with a plastics extruder, said means for forming said filter zone and said pressurized inlet and outlet conduit means adapted to withstand pressures in excess of 1000 psi and each of said channel sections being formed of fluid tight walls for a length sufficient to ensure a plurality of said seal members to be located in each channel section throughout operation to provide said seals between said pressurized filter zone and external space.

12. The apparatus of claim 11 wherein said filter screen includes longitudinal tensile members enabling pulling of said screen through said pressurized filter zone without rupture.

13. The apparatus of claim 11 including means enabling continuous pulling of said filter screen through said pressurized filter zone.

14. The apparatus of claim 11 wherein said filter screen comprises a mesh sized to transmit molten plastic while retaining contaminants.

15. The apparatus of claim 14 wherein said seal members comprise relatively rigid members bonded to said screen.

16. The apparatus of claim 14 wherein said seal members include lips adapted to be forced by said molten plastic against a side wall of said channel section for sealing.

17. The apparatus of claim 11 wherein said seal members extend widthwise beyond the longitudinal edges of said screen for effecting edge sealing with corresponding edges of said channel sections.

18. The apparatus of claim 8 wherein said seal members on the upstream side of said screen have outer extremities raised from said screen sufficient to provide a compartment for containing and removing contaminants screened from said molten plastic by said screen.

* * * * *